July 22, 1952 W. H. BIXBY 2,604,618
REGULATED RECTIFYING APPARATUS
Filed March 1, 1950
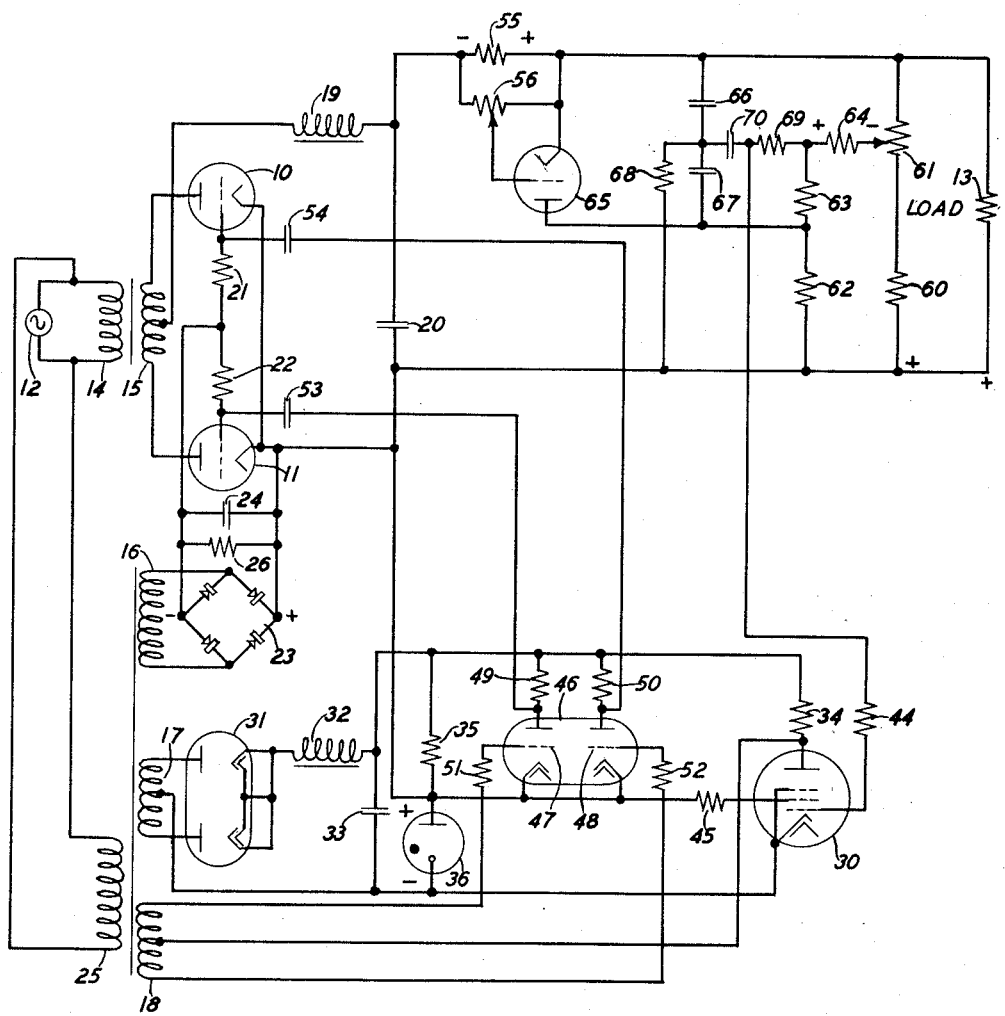
INVENTOR
W. H. BIXBY
BY
G. F. Heuerman
ATTORNEY Patented July 22, 1952

2,604,618

UNITED STATES PATENT OFFICE 2,604,618

REGULATED RECTIFYING APPARATUS

William H. Bixby, Detroit, Mich., assignor to Donald R. Middleton and Stanley M. Hanley, doing business as Power Equipment Company, a copartnership, Detroit, Mich.

Application March 1, 1950, Serial No. 147,054

7 Claims. (Cl. 321—19)

This invention relates to voltage regulation and particularly to a rectifier for supplying current to a load at substantially constant voltage.

An object of the invention is to provide improved regulated rectifying apparatus for applying direct current to a load.

A further object is to provide, in a regulated rectifier for supplying direct current to a load, improved means for controlling the relationship between load voltage and load current.

This invention is an improvement over the invention disclosed and claimed in my copending application Serial No. 35,948, filed June 29, 1948.

In accordance with an embodiment of the invention herein shown and described for the purpose of illustration, there is provided a polyphase rectifier comprising a plurality of grid controlled, gas-filled, space current devices, one for each phase, for rectifying current from an alternating-current supply source, the rectified current being supplied to a load circuit. While a two-phase rectifier is specifically shown and described, the invention is also applicable to rectifiers having a larger number of phases. Means are provided for generating large amplitude voltage pulses having a steep wave front which are impressed upon the grid-cathode circuits of the rectifier tubes repeatedly in succession for causing the tubes, respectively, to conduct space current during successive periods in which the anodes of the respective tubes are positive with respect to the cathodes. When conduction is started in each tube, it will continue to pass space current during a time interval equal to that of a half cycle of the alternating-current supply source. There is provided for generating the triggering pulses for starting conduction in the rectifier tubes a circuit arrangement comprising a plurality of space current devices or pulse generating triodes, one for each rectifier tube. There is impressed upon the control grid-cathode circuit of each of the pulse generating devices a voltage having an alternating voltage component derived from the alternating-current supply source and a variable unidirectional voltage component obtained from the output circuit of a control amplifier having its input connected to the load circuit. The series of triggering pulses are advanced or delayed in response to amplitude changes of the unidirectional voltage component to control the output voltage of the rectifier.

For setting up the unidirectional voltage component in the output circuit of the control amplifier, a plurality of voltage components are impressed upon the input circuit of the control amplifier, one of these voltage components being proportional to the voltage across the load. This voltage component tends to maintain the load voltage constant but, due to the limited power gain of the control amplifier, the load voltage decreases as the load current is increased when the component proportional to load voltage is used alone for controlling the control amplifier. It is desirable, therefore, to combine with the load voltage component a second voltage component which varies in accordance with the current supplied to the load for minimizing or preventing the lowering of the load voltage with increasing load current. A voltage proportional to load current can be obtained across a resistor connected in series with the load. However, the use of a sufficiently large series resistor for this purpose is not only wasteful of power in rectifiers of large size but its use may even be self-defeating due to the increased droop of the load voltage with increasing load current which the series resistor introduces.

Load compounding is therefore preferably obtained by employing in series with the load a small resistor, the voltage drop across which is a small fraction of the load compensating voltage component which is required to be added to the load voltage component in the input circuit of the control amplifier, and amplifying a portion at least of the voltage drop across the resistor to obtain a load compensating voltage which is suitable for use in the control amplifier input circuit. The dynamic response of the regulated rectifier is improved by also including in the input circuit of the control amplifier a transient voltage component which is proportional to the rate of change of the current supplied by the rectifier to the load circuit.

The invention will now be described in greater detail with reference to the accompanying drawing the single figure of which is a schematic view of a regulated rectifier embodying the invention.

Referring to the drawing, there is provided a rectifier comprising three-electrode, gas-filled, space current devices 10 and 11, such as type C6J, for rectifying current from an alternating-current supply source 12 and for supplying the rectified current to a load circuit comprising a load 13. A two-phase rectifier is shown for the sake of simplicity, the invention also being applicable to a rectifier having a smaller or larger number of phases, a six-phase rectifier for example. There is provided a transformer having a primary winding 14 connected to the alternating-current supply source 12 and a secondary winding 15. There is provided a second transformer having a primary winding 25 connected to the supply source 12 and having secondary windings 16, 17 and 18. The end terminals of transformer winding 15 are connected to the anodes, respectively, of rectifier tubes 10 and 11 and a mid-tap of winding 15 is connected through inductive reactance element 19 of a ripple filter and a series resistor 55 of 0.069 ohm, shunted by a 300-ohm potentiometer 56, to the negative terminal of load 13, the ripple filter also comprising a shunt condenser 20 connected across the load circuit. The cathodes of tubes 10 and 11 are connected to the positive load terminal. The control grids of tubes 10 and 11 are connected by resistors 21 and 22, each having a resistance of the order of 50,000 ohms. A bridge type auxiliary rectifier 23 having an asymmetrically conducting element in each arm of the bridge has its input terminals connected to the terminals of secondary transformer winding 16. The positive output terminal of rectifier 23 is connected to the cathodes of tubes 10 and 11 and the negative output terminal of rectifier 23 is connected to the common terminal of resistors 21 and 22. A filtering condenser 24 and a bleeder resistor 26 are connected in parallel across the output terminals of rectifier 23. The control grid of each of tubes 10 and 11 is thus negatively biased with respect to its cathode to prevent space current conduction in each tube in the absence of a positive potential triggering or starting pulse impressed upon the control grid with respect to the cathode.

There is provided an amplifier comprising space current device 30, such as type 6SJ7 for setting up in its output circuit a varying unidirectional voltage in response to a plurality of voltage components derived from the load circuit and impressed upon its input circuit, as will be described below. Space current is supplied to tube 30 from an auxiliary rectifier comprising a full wave rectifier tube 31, such as type 6X5. The anodes of tube 31 are connected to the end terminals of transformer winding 17 and a mid-terminal of the winding is connected to the negative output terminal of the auxiliary rectifier. A ripple filter comprising a series inductive reactive element 32 and a shunt condenser 33 is provided, the cathode of tube 31 being connected through inductance element 32 to the positive output terminal of the rectifier. The positive terminal of rectifier 31 is connected through a resistor 34 of 50,000 ohms to the anode of tube 30 while the negative output terminal of the rectifier is connected directly to the cathode of tube 30. A shunt current path connected to the output terminals of recifier 31 comprises, in series, a resistor 35 of 10,000 ohms and a cold cathode, gas-filled tube 36 of type OC-3, for example. The tube 36 has the characteristic that its resistance changes in response to changes of current flowing through the tube so that the voltage across the tube remain substantially constant, output voltage changes of recifier 31 appearing across resistor 35. Screen grid potential is supplied to tube 30 from the common terminal of resistor 35 and constant voltage tube 36 through a resistor 45 of 10,000 ohms.

There is provided a pulse generating circuit arrangement comprising a twin triode tube, such as type 12SN7, having two triode space current devices 47 and 48. The cathodes of triodes 47 and 48 are connected to a common terminal of resistor 35 and constant voltage tube 36. The positive terminal of rectifier 31 is connected through a resistor 49 to the anode of triode 47 and through a resistor 50 to the anode of triode 48, the resistance of each of resistors 49 and 50 being about 50,000 ohms. One end terminal of transformer winding 18 is connected through a resistor 51 to the control electrode of triode 47 and the other end terminal of winding 18 is connected through a resistor 52 to the control electrode of triode 48, resistors 51 and 52 each having a resistance of the order of 500,000 ohms. A mid-terminal of transformer winding 18 is connected to the anode of tube 30. The anode of triode 47 is connected through a condenser 53 to the control grid of tube 11 and the anode of triode 48 is connected through a condenser 54 to the control grid of tube 10, the capacitance of each of condensers 53 and 54 being of the order of 0.05 microfarad.

The instant during the respective half cycles of the current from source 12 at which current conduction is interrupted in triodes 47 and 48 for causing the generation of pulses which initiate conduction in rectifier tubes 11 and 10 is controlled by the voltage derived from the load circuit and impressed upon the grid-cathode circuit of amplifier tube 30. The circuit arrangement for deriving the control voltage for amplifier tube 30 comprises resistor 60 of 30,000 ohms and 10,000-ohm potentiometer 61 connected in series across the load 13 and a current path comprising resistors 62 and 63, each of 100,000 ohms, and resistor 64 of 10,000 ohms, all in series, connected across resistor 60 and an adjustable portion of potentiometer 61. There is also provided a space current device 65, such as type 6SF5, having its anode connected to the common terminal of resistors 62 and 63, its cathode connected to the negative load terminal and its control grid connected to an adjustable tap of potentiometer 56. Condenser 66 of 0.1 microfarad and condenser 67 of 0.07 microfarad are connected in series across the anode-cathode path of tube 65. A resistor 68 of 100,000 ohms is in a path connecting the common terminal of condensers 66 and 67 and the positive load terminals. The common terminal of resistors 63 and 64 is connected through a 100,000-ohm resistor 69 and resistor 44 to the control electrode of tube 30. The common terminal of condensers 66 and 67 is connected through a condenser 70 of 0.5 microfarad to the common terminal of resistors 44 and 69.

A current path may be traced from the control electrode of tube 30, through resistor 44, resistor 69, resistor 64, a portion of potentiometer 61, resistor 60 and constant voltage tube 36 to the cathode of tube 30. A first voltage component across resistor 60 and potentiometer 61 in this current path is substantially proportional to the load voltage, a second voltage component across resistor 64 varies substantially directly with load current, and the third voltage component across tube 36 is substantially constant, the first voltage component being in opposition to the second and third components. Vacuum tube 65 is of a type having a high amplification factor so that only a small voltage drop across resistor 55 is required to bias the tube to cut-off. Resistor 55 is then so selected that, with maximum load current flowing therethrough and with potentiometer 56 set for maximum voltage across the grid-cathode circuit of tube 65, the grid-cathode bias will be somewhat less than the value required for cut-off. For maximum load current, therefore, the space current of tube 65 flowing through resistor 62 will be relatively small. A decrease of load current will cause the anode-cathode resistance of tube 65 to decrease and its space current to increase, thus causing the current flowing through resistor 62 and the voltage drop across it to increase and causing the current flowing through resistors 63 and 64 and a portion of potentiometer 61 and the voltage drop across these resistances to decrease. As previously stated, resistor 60, a portion of potentiometer 61 and resistor 64 are in the grid-cathode circuit of tube 30 so that an increase of load voltage will make the grid relatively more negative with respect to its cathode due to the increased voltage drop across resistor 60 and a portion of potentiometer 61 and an increase of load current will make the grid of tube 30 relatively more positive with respect to its cathode due to the increased voltage drop across resistor 64. Considered somewhat differently, resistors 62 and 63 in series are in the grid-cathode circuit of tube 30. An increase of load voltage alone will cause the voltage drop across resistors 62 and 63 to increase thereby making the grid of tube 30 relatively more negative while an increase of load current alone will cause the voltage across resistors 62 and 63 in series to drop, thereby making the grid of tube 30 relatively more positive.

Certain transient voltage components are also impressed upon the grid-cathode circuit of tube 30. While the output voltage of rectifier 10, 11 is increasing, for example, there is impressed upon the control grid with respect to the cathode of tube 30 a transient voltage proportional to the rate of increase of the load voltage due to the charging current of condensers 70 and 66 flowing through resistor 60, a portion of potentiometer 61 and resistors 64 and 69. The polarity of the transient voltage thus set up across a portion of potentiometer 61 and resistors 60, 64 and 69, is such as to limit the rise of the rectifier output voltage and thus to prevent overshooting of the output voltage and hunting of the regulated rectifier.

While the current supplied to the load is increasing, for example, the space current through tube 65 decreases and current flows through resistors 62 and 68 for increasing the charge on condensers 67 and 66 which form a voltage divider across the anode-cathode path of tube 65. Current also flows through a shunt path across condenser 66 for increasing the charge on condenser 70, said path comprising condenser 70, resistors 69 and 64 and a portion of potentiometer 61. The resulting transient voltage across resistors 69 and 64 has a polarity such as to increase the output of the rectifier 10, 11 and is proportional to the rate of increase of the load current. The dynamic response of the regulated rectifier is thus improved. Since condenser 70 has a large capacity compared to that of condenser 66, condenser 67 could be connected between the common terminal of resistors 62 and 63 and the common terminal of condenser 70 and resistor 69 without materially changing the operation of the circuit. The magnitude of the transient voltage component which is proportional to the rate of change of load current can be varied by changing the capacity of condenser 67, the capacity of condenser 66 usually being fixed by stability considerations.

As previously stated, the grid-cathode circuit of tube 30 comprises in series, resistors 44, 69, 64 and 60, an adjustable portion of potentiometer 61 and constant voltage tube 36. If due to an increase of load voltage or to a decrease of load current, for example, the voltage measured between the positive load terminal and the common terminal of resistor 69 and condenser 70 should rise, the control grid of tube 30 would become relatively more negative with respect to its cathode, thus causing the voltage across resistor 34 to decrease and the potential at the anode of tube 30 to become relatively more positive with respect to its cathode and, therefore, with respect to the positive load terminal. The voltage across resistor 35 will increase in response to an increase of the voltage of supply source 12, and vice versa. The grid-cathode circuit of triode 47 may be traced from the grid through resistor 51, the upper half portion of transformer winding 18, resistor 34 and resistor 35 to the cathode. A similar grid-cathode circuit may be traced for the triode 48, this circuit including resistor 52 and the lower half portion of winding 18. The voltages across resistors 34 and 35 are in opposition with respect to each other in each of these circuits and the voltage across resistor 34 is smaller than the voltage across resistor 35 so that the resultant direct voltage component in the grid-cathode circuit is of such polarity as to make the control grid positive with respect to the cathode. The phase of the alternating voltage component from transformer 18 impressed upon the control circuit of triode 47, for example, is preferably in opposition to the voltage which is impressed from the lower portion of transformer winding 15 upon the anode-cathode circuit of tube 11.

The large resistance of resistor 51 in the grid-cathode circuit of triode 47, for example, limits the positive potential which can appear at the grid with respect to the cathode to a relatively small value because of the grid current which flows through the resistor. As a result, when the grid is positive, the triode will pass a fixed space current and the potential at the anode will remain substantially fixed with respect to the cathode up to the time when the alternating voltage component in the grid-cathode circuit suddenly drives the grid to a negative potential through the cut-off value, causing the space current to decrease rapidly to zero. The alternating voltage component in the grid-cathode circuit has a large amplitude such that the change of grid-cathode voltage from a positive value to a negative cut-off value will occur within a very brief time interval. The resulting abrupt decrease of space current in triode 47 will produce an abrupt rise of the potential at the anode of triode 47 with respect to its cathode and, therefore, with respect to the cathode of tube 11. This sharp, positive pulse is impressed through condenser 53 upon the control grid of tube 11 to cause it to conduct space current, this conduction continuing during a period in which the anode of tube 11 is positive with respect to its cathode. The sum of the voltage across inductance element 19 and the voltage across the lower half portion of transformer winding 15 maintains the anode of tube 11 positive with respect to its cathode until conduction is initiated in tube 10.

The circuit should be so adjusted that the potential of the anode of amplifier tube 30 will not be appreciably less than the potential of the screen grid of the tube for any normal operating condition. Since, with the choke coil 19 in the input of the main filter section, full control of the output current will be obtained by varying the firing angle of each of tubes 10 and 11 over a range from zero to ninety degrees in the respective conducting half cycles of tubes 10 and 11, the firing angle should be approximately at zero degree when the potential of the anode of tube 30 is approximately at the screen grid potential of tube 30. The alternating component of the control electrode-cathode voltage of triode 47, for example, is therefore preferably in phase opposition to the alternating voltage across the lower half of transformer winding 15. In some rectifiers, such as two-phase rectifiers employing a filter choke 19 the inductance of which is less than a certain critical value or rectifiers having a larger number of phases, it would be necessary to provide a phase shifter for shifting the phase of the voltage derived from source 12 and applied to the control electrode-cathode circuits of the pulse generating triodes like triodes 47 and 48.

An increase of the direct component of the grid-cathode voltage of triode 47, for example, will cause the cut-off potential of the triode to be reached later in each cycle of the alternating voltage component of the grid-cathode voltage of the triode. As a result, the triggering or starting pulse impressed upon the grid-cathode circuit of tube 11 will occur later in the positive half cycle of the anode-cathode voltage, that is, when the anode is positive with respect to the cathode. The average voltage supplied by the rectifier to the input of filter 19, 20 is thus decreased. A negative pulse will be produced at the anode of triode 47 when space current is started in the triode due to the grid potential passing through the cut-off value to a positive value of potential. This negative pulse will have no effect on the space current path of tube 11 and it may therefore be disregarded in considering the operation of the current supply circuit. The triode 48 is controlled similarly to the triode 47 to produce recurring positive pulses for starting conduction of space current in tube 10 during half cycle periods of the alternating voltage from source 12 when the anode of tube 10 is positive with respect to its cathode.

The load voltage may be set at a desired value within an operating range by adjusting the variable tap of potentiometer 61. When the potentiometer is set for maximum load voltage and when maximum current is being supplied to the load, the voltage across resistor 34 is at a maximum value. When the voltage of source 12 is at a minimum operating value, the voltage across resistor 35 is at a minimum value. For these operating conditions the direct voltage component in the grid-cathode circuit of each of triodes 47 and 48 is relatively small and conduction of space current in tubes 10 and 11 will occur relatively early in the positive half cycles of the anode-cathode voltage of each of tubes 10 and 11. Potentiometer 56 may be adjusted to give a desired relationship between the load voltage and load current. The setting of potentiometer 56 may be such, for example, that the load voltage remains substantially constant for all values of load current within an operating range.

For any setting of potentiometer 61, when there is a decrease of load voltage the control grid of tube 30 will become relatively more positive with respect to its cathode with the result that the voltage drop across resistor 34 will increase. The direct voltage component in the grid-cathode circuit of triodes 47 and 48 will thus decrease to cause the starting pulses impressed upon the grid-cathode circuits of tubes 10 and 11 to occur earlier. The average voltage supplied by the rectifier to filter 19, 20 is thus increased to cause the initially assumed drop of load voltage to be minimized. If in addition to the decrease of load voltage the current supplied to the load is increased, for example, there is impressed upon the grid-cathode circuit of tube 30 an additional voltage component which makes the grid relatively still more positive with respect to the cathode, thus further increasing the average voltage supplied by the rectifier to the filter 19, 20. The load voltage may thus be prevented from decreasing with increasing current supplied to the load or, if desired, the load voltage may even be caused to increase with increasing load current.

What is claimed is:

1. Apparatus for regulating the voltage across a load to which direct current is supplied from a current source comprising a first current path connected across said load, means in said current path for deriving a first voltage component having variations corresponding to load voltage changes, a second current path connected across a portion at least of said first current path, means comprising a space current device controlled in accordance with the current supplied to the load for causing to be set up across a portion at least of said second current path a second voltage component having variations corresponding to load current changes, and means responsive to said first and second voltage components for controlling the current supplied to said load to thereby regulate the load voltage.

2. The combination with means for supplying direct current to a load, of resistance means connected across said load, a first space current device having an anode, a cathode and a control electrode, means for impressing upon the control electrode-cathode circuit of said device a voltage substantially proportional to the current supplied to said load, means for connecting the anode-cathode path of said device across a portion of said resistance means, a second space current device having an anode, a cathode and a control electrode, a space current circuit for said second device including a source of space current, a circuit connecting the control electrode and cathode of said second device including a portion of said resistance means, and means for regulating the voltage across said load in response to space current changes of said second device.

3. A combination in accordance with claim 2 in which there are provided a first, a second and a third condenser, means for connecting said first and second condensers in series across the anode-cathode path of said first space current device, and a current path including said third condenser connecting a common terminal of said first and second condensers and the control electrode of said second space current device.

4. In combination, means for supplying direct current to a load circuit including a load, means for deriving across a portion of said load circuit in a shunt path across said load a first voltage component which increases in response to an increase of load voltage and vice versa, means comprising a space current device for setting up in said portion of said load circuit a second voltage component which increases in response to a decrease of current supplied to said load circuit and vice versa, and means responsive to said first and second voltage components for controlling said means for supplying direct current to said load circuit.

5. In combination, a rectifier for supplying rectified current to a load, one output terminal of said rectifier being connected to a first load terminal, a first resistor, means for connecting the second output terminal of said rectifier through said resistor to the second terminal of said load, said rectifier having control means for controlling the current supplied to said load, a resistive path connected across said load, a second, a third and a fourth resistor connected in series across a portion at least of said resistive path, said second resistor having a terminal connected to said first load terminal, said second and third resistors having a common terminal, a space current device having an anode, a cathode and a control electrode, said cathode being connected to said second load terminal, means for impressing a portion at least of the voltage across said first resistor upon the control electrode-cathode circuit of said space current device, means for connecting the anode of said space current device to the common terminal of said second and third resistors, a first and a second condenser connected in series across the anode-cathode path of said space current device, a third condenser having a first terminal connected to the common terminal of said first and second condensers, a fifth resistor having a first terminal connected to the common terminal of said third and fourth resistors, means for connecting the second terminal of said third condenser to the second terminal of said fifth resistor, a sixth resistor having one terminal connected to the common terminal of said first and second condensers and a second terminal connected to said first load terminal, and means connected to the common terminal of said third condenser and said fifth resistor and to said first load terminal for controlling said control means to cause load voltage variations to be minimized.

6. A combination in accordance with claim 5 in which said rectifier comprises a gas-filled space current device having an anode, a cathode and a control electrode, and in which said means for controlling said rectifier comprises means for generating pulses and means for impressing the pulses upon the control electrode-peatedly initiating conduction of space current therein, said pulses being advanced or retarded in accordance with changes of the potential of said common terminal of said third condenser and said fifth resistor with respect to the potential of said first load terminal.

7. In combination, a first resistor, a direct-current source for supplying current through said resistor to a load, a resistance path connected across said load comprising a second and third resistor in series and having a common terminal, a space current device having a cathode, an anode and a control electrode, means for impressing a portion at least of the voltage drop across said first resistor upon the control electrode-cathode path of said space current device, means for connecting said anode to the common terminal of said second and third resistors, and means responsive to the voltage across said second and third resistors for controlling the current supplied by said direct-current source to said load.

WILLIAM H. BIXBY.

REFERENCES CITED

The following references are of record in the file of this patent:

UNITED STATES PATENTS

| Number | Name | Date |
|--------|------|------|
| 2,197,934 | Koch | Apr. 23, 1940 |